United States Patent
Lee et al.

(10) Patent No.: US 12,415,876 B2
(45) Date of Patent: Sep. 16, 2025

(54) METHOD FOR PRODUCING VINYL CHLORIDE-BASED POLYMER

(71) Applicant: LG CHEM, LTD., Seoul (KR)

(72) Inventors: Kwang Jin Lee, Daejeon (KR); Yang Jun Jeon, Daejeon (KR); Jae Hyun Park, Daejeon (KR); Hyun Kyou Ha, Daejeon (KR)

(73) Assignee: LG CHEM, LTD., Seoul (KR)

( * ) Notice: Subject to any disclaimer, the term of this patent is extended or adjusted under 35 U.S.C. 154(b) by 681 days.

(21) Appl. No.: 17/606,358

(22) PCT Filed: Sep. 7, 2020

(86) PCT No.: PCT/KR2020/012064
§ 371 (c)(1),
(2) Date: Oct. 25, 2021

(87) PCT Pub. No.: WO2021/049836
PCT Pub. Date: Mar. 18, 2021

(65) Prior Publication Data
US 2022/0227899 A1    Jul. 21, 2022

(30) Foreign Application Priority Data
Sep. 11, 2019    (KR) .................. 10-2019-0113003

(51) Int. Cl.
*C08F 114/06* (2006.01)
*C08F 2/00* (2006.01)
(Continued)

(52) U.S. Cl.
CPC .............. *C08F 114/06* (2013.01); *C08F 2/22* (2013.01); *C08F 2/26* (2013.01); *C08F 2/44* (2013.01); *C08K 3/26* (2013.01); *C08F 2/00* (2013.01); *C08F 2/001* (2013.01); *C08K 2003/262* (2013.01)

(58) Field of Classification Search
None
See application file for complete search history.

(56) References Cited

U.S. PATENT DOCUMENTS 5,378,780 A     1/1995   Kruse et al.
6,242,541 B1 *  6/2001   Hohenadel .............. C08F 14/06
                                               526/345

(Continued)

FOREIGN PATENT DOCUMENTS

CN     85103368 A    11/1986
CN     1217344 A     5/1999
(Continued)

*Primary Examiner* — Satya B Sastri
(74) *Attorney, Agent, or Firm* — Bryan Cave Leighton Paisner LLP

(57) ABSTRACT

A method for producing a vinyl chloride-based polymer, wherein the vinyl chloride-based polymer is produced by sequentially adding a first emulsifier and a second emulsifier, which are different from each other, during polymerization and using a succinate compound as a first emulsifier. The method provides improved processability by achieving low-viscosity properties when plastisol is mixed using the produced polymer, and improved fogging properties by suppressing generation of volatile organic compounds.

9 Claims, 1 Drawing Sheet

(51) Int. Cl.
  *C08F 2/22*    (2006.01)
  *C08F 2/26*    (2006.01)
  *C08F 2/44*    (2006.01)
  *C08K 3/26*    (2006.01)

(56) References Cited

U.S. PATENT DOCUMENTS

| | | |
|---|---|---|
| 7,973,194 B1 | 7/2011 | Kinkade et al. |
| 2002/0019474 A1 | 2/2002 | Nakagawa et al. |
| 2009/0197998 A1 | 8/2009 | Weiss et al. |

FOREIGN PATENT DOCUMENTS

| | | | | |
|---|---|---|---|---|
| CN | 1331258 A | | 1/2002 | |
| CN | 1514847 A | | 7/2004 | |
| EP | 2039718 B | | 8/2016 | |
| GB | 1597285 A | * | 9/1981 | ............. C08F 14/06 |
| JP | H07-258303 A | | 10/1995 | |
| JP | 2002-020407 A | | 1/2002 | |
| JP | 2009-242678 A | | 10/2009 | |
| KR | 10-2001-0020484 A | | 3/2001 | |
| KR | 10-0676541 B | | 1/2007 | |
| KR | 10-2012-0073672 A | | 7/2012 | |
| KR | 10-2012-0107201 A | | 10/2012 | |
| KR | 10-2013-0090842 A | | 8/2013 | |
| KR | 10-2015-0031817 A | | 3/2015 | |
| KR | 10-2015-0123459 A | | 11/2015 | |
| KR | 10-2019-0050082 A | | 5/2019 | |
| KR | 10-2019-0075346 A | | 7/2019 | |
| WO | 9955745 A1 | | 11/1999 | |

* cited by examiner

METHOD FOR PRODUCING VINYL CHLORIDE-BASED POLYMER

CROSS-REFERENCE TO RELATED APPLICATIONS

This application is a National Stage Application of International Application No. PCT/KR2020/012064 filed on Sep. 7, 2020, which claims priority to and benefit of Korean Patent Application No. 10-2019-0113003 filed on Sep. 11, 2019, disclosures of which are incorporated by reference herein in their entirety for all purposes as if fully set forth herein.

TECHNICAL FIELD

The present disclosure relates to a method for producing a vinyl chloride-based polymer which has excellent processability by not only achieving low-viscosity properties but also exhibiting a stable viscosity, and has excellent fogging properties by reducing the generation of volatile organic compounds.

BACKGROUND

A vinyl chloride-based polymer, which is a resin containing 50% or more of a vinyl chloride, is inexpensive, easy to control hardness, and applicable to most processing machines, and thus has a variety of application fields. In addition, the vinyl chloride-based polymer is widely used in various fields because the vinyl chloride-based polymer may provide a molded article having excellent physical and chemical properties, such as mechanical strength, weather resistance, and chemical resistance.

This vinyl chloride-based polymer is prepared in various forms according to the application thereof. For example, a vinyl chloride-based polymer for straight processing such as an extrusion process, a calendar process, and an injection process is generally prepared by suspension polymerization, and a vinyl chloride-based polymer for paste processing such as a dipping, a spraying, and a coating is prepared by an emulsion-polymerization.

In the paste processing, a vinyl chloride-based polymer latex for paste processing, which is generally obtained through emulsion-polymerization, is spray-dried to thereby form final resin particles. The particles are dispersed in a solvent or a plasticizer, and are applied to a product such as flooring materials, wallpaper, tarpaulin, raincoat, gloves, an automobile underbody coating, a sealant, and a carpet tile through a process such as coating (reverse roll-coating, knife coating, screen coating, spray coating), gravure and screen printing, rotation casting, and shell casting and dipping. It is difficult for such a vinyl chloride-based polymer for paste processing alone to be applied due to its poor processability, and thus the vinyl chloride-based polymer is usually processed and used in the form of a plastisol composed of various additives such as a heat stabilizer together with a plasticizer. In this case, in order to improve the processability of the vinyl chloride polymer, it is important to lower the viscosity of the plastisol to maintain good flowability.

Accordingly, in order to improve the processability of the vinyl chloride-based polymer, the content of the plasticizer was adjusted and blended. However, if the content of the plasticizer was increased, the plasticizer itself was separated inside the resin due to migration, volatility, and extractability after being processed, thereby leading to deterioration of properties and accelerating aging.

In another case, when the content of the plasticizer is increased, the processing viscosity of the plastisol may be significantly reduced. In this case, the processability may be deteriorated due to a sol drop phenomenon during a coating process.

In addition, in recent years, demands for non-toxicity to humans and environments as well as the performance of the vinyl chloride-based polymer are increasing. Accordingly, many studies are being conducted to reduce volatile organic compounds generated in molded articles manufactured using vinyl chloride-based polymers, and studies are being conducted on various additives, such as a plasticizer, which are mainly used as sub-materials.

For example, European Patent Application EP2039718 describes a method of using a plasticizer mixture based on alkylsulfonate and diol dibenzoate instead of a phthalate-based plasticizer, and U.S. Pat. No. 7,973,194 discloses a highly solvating plasticizer mixture for polyvinyl chloride plastisol which contains dibutyl ester, dibenzyl ester and butyl benzyl ester of 1,4-cyclohexane dicarboxylic acid.

However, the above-described method fails to sufficiently reduce the generation of volatile organic compounds, and in particular, as various regulations on the environment are continuously increasing, there is a limitation in lowering the generation degree of volatile organic compounds to an appropriate level or less only by replacing a plasticizer used as a sub-material.

Therefore, a method is required which is capable of reducing volatile organic compounds generated from a vinyl chloride-based polymer itself while maintaining the effective physical properties of the vinyl chloride-based polymer.

As such, it is necessary to conduct studies on a method for producing a vinyl chloride-based polymer in which even if the content of a plasticizer is not significantly increased when a plastisol is blended, the processing viscosity is lowered to improve the processability, the processing viscosity is not rapidly decreased due to the addition of the plasticizer to stably maintain a processing viscosity, and volatile organic compounds generated from the vinyl chloride-based polymer are reduced, thereby ensuring excellent fogging properties.

PRIOR ART LITERATURE (Patent Literature 1) EP 2039718 B1 (Mar. 25, 2009)
(Patent Literature 2) U.S. Pat. No. 7,973,194 B1 (Jul. 5, 2011)

Technical Problem

An aspect of the present disclosure provides a method for producing a vinyl chloride-based polymer which has low viscosity to improve processability during blending of plastisol, has excellent foaming properties, and has excellent fogging properties due to the high density of foam cells.

Technical Solution

In order to solve the above problems, according to an aspect of the present disclosure, a method for producing vinyl chloride-based polymer includes the steps of: 1) adding a vinyl chloride-based monomer into a reactor to initiate polymerization; 2) continuously adding a first emulsifier to the reactor from a polymerization initiation time to a time when a polymerization conversion rate reaches a range of 35% to 52%; and 3) continuously adding a second emulsifier after completing the adding of the first emulsifier, wherein the first emulsifier and the second emulsifier are different from each other, and the first emulsifier is a succinate compound.

According to another aspect of the present disclosure, the first emulsifier and the second emulsifier are added at a weight ratio of 5:5 to 9:1.

According to another aspect of the present disclosure, the second emulsifier includes a sulfate compound.

Advantageous Effects

A vinyl chloride-based polymer prepared by a production method according to the present disclosure may exhibit low-viscosity properties and thus have an excellent processability even when the content ratio of a plasticizer is not significantly increased. Furthermore, the vinyl chloride-based polymer may have a stable processing viscosity since the viscosity thereof is not greatly changed even with a change in the plasticizer content.

In addition, the method for producing a vinyl chloride-based polymer according to an embodiment of the present invention may suppress the generation of volatile organic compounds, and may produce a vinyl chloride-based polymer having excellent fogging properties compared to conventional vinyl-chloride-based polymers.

In addition, the method for producing a vinyl chloride-based polymer according to an embodiment of the present invention may produce a vinyl chloride-based polymer that has further improved foaming properties due to densely formed foaming cells while satisfying the aforesaid processability and fogging properties.

BRIEF DESCRIPTION OF DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DETAILED DESCRIPTION

Figure 1:
FIG. 1 is a photograph that shows a cross section of a foam prepared from a polymer of Example 1 of the present disclosure and is taken with an optical microscope.

Hereinafter, the present disclosure will be described in more detail to allow for a clearer understanding.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The term used herein, "vinyl chloride-based polymer," encompasses a compound produced by polymerizing a vinyl chloride-based monomer alone or a mixture of a vinyl chloride-based monomer and a vinyl-based monomer copolymerizable with a vinyl chloride-based monomer, and may indicate a polymer chain derived from a vinyl chloride-based monomer.

The term used herein, "plastisol," refers to a mixture of a resin and a plasticizer that may be formed, molded, or processed into a continuous film form by heating, for example, may refer to a paste form in which a vinyl chloride-based polymer and a plasticizer are mixed.

The term used herein, "plasticizer," may indicate an organic additive material that serves to improve the formability of a resin at high temperature by being added into a thermoplastic-resin to increase a thermoplastic property.

According to an embodiment of the present invention, a method for producing a vinyl chloride-based polymer may include the steps of: 1) adding a vinyl chloride-based monomer into a reactor to initiate polymerization; 2) continuously adding a first emulsifier to the reactor from a polymerization initiation time to a time when a polymerization conversion rate reaches 35% to 52%; and 3) continuously adding a second emulsifier after completing the adding of the first emulsifier. Here, the first emulsifier and the second emulsifier may be different from each other, and the first emulsifier may be a succinate compound.

Hereinafter, it will be described in detail for each step.

Step 1

According to an embodiment of the present invention, a step 1) of a method for producing a vinyl chloride-based polymer is a step in which a vinyl chloride-based monomer is added to a reactor and a polymerization is initiated, and a vinyl chloride-based polymer is formed from a vinyl chloride-based monomer. In addition, according to one embodiment of the present invention, the polymerization may be preferably carried out by an emulsion-polymerization method.

Specifically, the polymerization in step 1) may be performed by adding a vinyl chloride-based monomer to a polymerization reactor filled with polymerization water and a polymerization initiator, and performing a polymerization reaction. In this case, the polymerization reactor filled with the polymerization water and the polymerization initiator may represent a polymerization reactor containing a mixed solution including the polymerization water and the polymerization initiator. The mixed solution may further include, in addition to the polymerization water and the polymerization initiator, a dispersant, a molecular weight modifier, an electrolyte and a reaction inhibitor, but the present invention is not limited thereto. Preferably, a carbonate-based metal salt may be further added to the reactor in step 1).

According to an embodiment of the present invention, the polymerization initiator may be used in an amount of 0.01 parts by weight to 2.0 parts by weight with respect to 100 parts by weight of the vinyl chloride-based monomer. Although not particularly limited, the polymerization initiator may be at least one selected from the group consisting of peroxy carbonates, peroxy esters, and an azo compound. Specifically, the polymerization initiator is lauryl peroxide (LPO), di-2-ethylhexyl peroxycarbonate (OPP), diisopropyl peroxydicarbonate, t-butyl peroxypivalate, t-butyl peroxy Neodecanoate, 2,2-azobisisobutyronitrile, and the like may be used alone, or two or more may be used in combination.

In addition, the polymerization initiator may be a water-soluble initiator. When the polymerization initiator is a water-soluble initiator, the polymerization initiator may be, although not particularly limited, at least one selected from the group consisting of potassium persulfate KPS, ammonium persulfate, and hydrogen peroxide. In the present disclosure, preferably, a water-soluble initiator may be used as the polymerization initiator, and specifically, potassium persulfate may be used.

In addition, the polymerized water may be used in an amount of 70 to 150 parts by weight with respect to 100 parts by weight of the vinyl chloride-based monomer, and the polymerized water may be deionized water.

In addition, according to an embodiment of the present invention, a vinyl chloride monomer may refer to a vinyl chloride monomer alone or a mixture of a vinyl chloride monomer and a vinyl-based monomer copolymerizable with the vinyl chloride monomer. That is, the vinyl chloride-based polymer according to an embodiment of the present invention may be a vinyl chloride homopolymer or a copolymer of a vinyl chloride monomer and a vinyl-based monomer copolymerizable therewith. If the vinyl chloride-based polymer is the copolymer, the vinyl chloride-based polymer may contain 50% or more of vinyl chloride.

Although not particularly limited, the vinyl-based monomer copolymerizable with the vinyl chloride monomer may be, for example: olefin compounds such as ethylene, propylene, butene; vinyl esters such as vinyl acetate, vinyl propionate, and vinyl stearate; unsaturated nitriles such as acrylonitrile; vinyl alkyl ethers such as vinyl methyl ether, vinyl ethyl ether, vinyl octyl ether, vinyl lauryl ether; vinylidene halides such as vinylidene chloride; unsaturated fatty acids and anhydrides of these fatty acids such as acrylic acid, methacrylic acid, itaconic acid, maleic acid, fumaric acid, maleic anhydride and itaconic anhydride; unsaturated fatty acid esters such as methyl acrylate, ethyl acrylate, monomethyl maleate, dimethyl maleate, and butyl benzyl maleate esters; and cross linkable monomers such as diallyl phthalate. In addition, the vinyl-based monomer may be used along or in combination of two or more.

In addition, the method for producing a vinyl chloride-based polymer according to an embodiment of the present invention may begin with controlling the pH to 8 or more in step 1), and may be implemented by adding a carbonate-based metal salt to a polymerization mixture The carbonate-based metal salt serves to control the pH of the polymerization mixture, and needs to be a material capable of raising the pH to a certain level. Specifically, the carbonate-based metal salt may include at least one selected from the group consisting of sodium carbonate ($Na_2CO_3$), sodium hydrogen carbonate ($NaHCO_3$), and potassium carbonate ($K_2CO_3$). As described above, it is preferable to add a substance capable of raising the pH of the polymerization mixture to a certain level, for example, raising the pH to 8 or more in terms of reducing the number of defects in the polymer.

The carbonate-based metal salt may be added in an amount of 100 to 1500 ppm with the respect to the total weight of the vinyl chloride-based monomer, and preferably, added in an amount of 200 ppm or more, or 300 ppm or more and in an amount of 1300 ppm or less, 1200 ppm or less, 1000 ppm or less, or 800 ppm or less. If the content of the carbonate-based metal salt falls within this range, it is possible not only to control the pH of the mixture to 8 or more, but also to affect a significant reduction in number of olefin-type defects and chloro-type defects in the final polymer.

In addition, it may be effective to add the carbonate-based metal salt at the initial stage of polymerization, and particularly the carbonate-based metal salt may be added before polymerization starts, that is, at a time before a conversion rate of 0% is counted. In other words, the polymerization may begin with adding the carbonate-based metal salt, and an addition method is not particularly limited, and for example, a continuous addition, a divided addition, and a batch addition may be used. Adding the carbonate-based metal salt at the above-mentioned time while satisfying the above-mentioned content may affect achieving the above-described effect.

As such, if the reaction pH is properly controlled when the carbonate-based metal salt is added during the polymerization, the number of defects in the final vinyl chloride-based polymer may be reduced, particularly, the ratio of pseudo-terminal trans-type defects among olefin-type defects may be maintained, and the ratio of terminal symmetric chloro-type defects among chloro-type defects may be maintained, thereby greatly contributing to an increase in heat resistance at last.

In addition, according to an embodiment of the present invention, although not particularly limited, the reaction inhibitor may employ, for example, paraquinone, hydroquinone, butylated hydroxy toluene, monomethyl ether hydroquinone, quaternary butyl catechol, diphenyl amine, triisopropanol amine, triethanol amine, etc. Although not particularly limited, the dispersant may employ a higher alcohol such as lauryl alcohol, myristic alcohol, or stearyl alcohol, or a higher fatty acid such as lauryl acid, myristic acid, palmitic acid, or stearic acid.

In addition, although not particularly limited, the molecular weight modifier may be, for example, n-butylmercaptan, n-octylmercaptan, n-dodecylmercaptan, t-dodecylmercaptan, etc. The electrolyte may be, by way of example, one or more selected from the group consisting of potassium chloride, sodium chloride, potassium bicarbonate, sodium carbonate, potassium carbonate, potassium hydrogen sulfite, sodium hydrogen sulfite, tetrapotassium pyrophosphate, tetrasodium pyrophosphate, tripotassium phosphate, trisodium phosphate, dipotassium hydrogen phosphate and disodium hydrogen phosphate. Although not particularly limited, the electrolyte may be one or more selected from the group consisting of potassium chloride, sodium chloride, potassium bicarbonate, sodium carbonate, potassium carbonate, potassium hydrogen sulfite, sodium hydrogen sulfite, tetrapotassium pyrophosphate, tetrasodium pyrophosphate, tripotassium phosphate, trisodium phosphate, dipotassium hydrogen phosphate and disodium hydrogen phosphate.

Step 2

In the method for producing a vinyl chloride-based polymer according to an embodiment of the present invention, step 2) is a step of performing the adding of the first emulsifier, and may be a step of continuously adding the first emulsifier to the reactor from the polymerization initiation time to the time when the polymerization conversion rate reaches a range of 35% to 52%. In addition, the first emulsifier may be a succinate compound.

The first emulsifier may be continuously added from the polymerization initiation time to the time when the polymerization conversion rate reaches 35% to 52%, preferably 35% to 48%, and more preferably 40% to 46%. Here, the polymerization initiation time may indicate the time at which the polymerization conversion rate is counted as 0%, and for example, indicate the time when the internal temperature of the reactor, in which the reaction mixture is present, reaches the polymerization temperature and the polymerization reaction starts. When the first emulsifier is added till the time when the polymerization conversion rate is less than 35%, the type of the emulsifier is changed before all initial polymer particles are formed, which makes it difficult to control the particle size of the polymer particles, and results in a polymer having a viscosity outside the desired viscosity property level. In addition, as a second emulsifier is added as a polymerization reactant too quickly, a time when the second emulsifier is exposed under hydrolysis conditions increases, thereby increasing the probability of hydrolysis. Therefore, there may be a problem in that the fogging properties of the polymer produced by the hydrolyzate of the second emulsifier are deteriorated. For example, when a succinate compound is added until the time when the conversion rate is less than 35%, then the type of the emulsifier is changed to a sulfate compound or the like as the second emulsifier, and the second emulsifier is added, the change time for the emulsifier is too early to increase the likelihood of hydrolysis of —SO-bonds in the sulfate compound as the second emulsifier. Accordingly, a large amount of alcohol compounds deteriorating the fogging properties may be generated, thereby greatly degrading the fogging properties of the prepared polymer. In addition, when the first emulsifier, that is, the succinate compound is continuously added until the time when the conversion rate exceeds 52%, the added amount of the first emulsifier per hour may be smaller than when the first emulsifier is added until the time when the conversion rate is 52% or less under conditions where the same amount of the first emulsifier is added in the entire reaction system. Accordingly, coarse particles are formed during initial particle generation, or the number of particles is remarkably small, thereby significantly lowering the viscosity of the prepared polymer. In addition, in the case where the added amount is not controlled, the succinate compound highly compatible with the plasticizer are added in an excessively large amount, and thus the viscosity may be significantly lowered to such an extent that it is difficult to process when mixing the plastisol. In addition, the influence of the second emulsifier in the prepared polymer may be reduced, which may cause a problem of deteriorating foaming properties, such as lowering the density of the foaming cells during foaming.

In addition, the first emulsifier may be a succinate compound, and the succinate compound collectively refers to a compound containing a succinate functional group. Specifically, the succinate compound may include a sulfosuccinate compound, and more specifically, include at least one selected from the group consisting of dioctyl sulfosuccinate, ditridecyl sulfosuccinate, lauryl ether sulfosuccinate (laureth sulfosuccinate) and lauryl sulfosuccinate. Among these, from the viewpoint of further improving the stability of the polymerization reaction and further improving the viscosity properties of the prepared polymer, the succinate compound may preferably include dioctyl sulfosuccinate.

In this case, the succinate compound may be used in the form of a salt ionically bonded with an alkali metal, alkaline earth metal, ammonium ion, amine and/or amino alcohol, and for example, the succinate compound may be used in the form of a salt ionically bonded with sodium ions (Na+). As an example, the succinate compound may be used in the form of sodium dioctyl sulfosuccinate, sodium ditridecyl sulfosuccinate, disodium laureth sulfosuccinate, or sodium lauryl sulfosuccinate.

In an embodiment of the present invention, the succinate compound used as the first emulsifier has excellent compatibility with a plasticizer, so that low-viscosity properties may be achieved during mixing of a plastisol, thereby greatly improving the processability of the plastisol. In addition, the succinate compound may stably maintain its structure compared to other types of emulsifiers, and thus the generation of causative substances that are likely to be converted into volatile organic compounds may be suppressed. Accordingly, a polymer having improved fogging properties may be prepared.

In contrast, when other types of compounds, such as a sulfate compound, other than the succinate compound is used as the first emulsifier, the probability of hydrolysis is increased because a structural stability is lower than that of the succinate compound. Particularly, when the sulfate compound is added from the polymerization initiation time, the proportion of a hydrolyzate may increase because the compound is exposed under a hydrolysis condition for a long period of time. At this time, the hydrolyzate causes a problem of deteriorating the fogging properties of the prepared polymer. For example, a sulfate emulsifier such as sodium lauryl sulfate may modify the bond structure to R—OH (in case of sodium lauryl sulfate, R means lauryl (dodecyl)) due to the low bond strength of the S—O bond in the structure, and the modified compound may become a substance that causes the fogging properties to be degraded. In addition, since the sulfate emulsifier has a poorer compatibility with a plasticizer than the succinate compound, there is a problem in that the sulfate emulsifier does not ensure the low-viscosity properties when a plastisol is produced with a polymer obtained by using the sulfate emulsifier alone, resulting in the poor processability. I the content of the plasticizer is increased to improve the processability during mixing of the plastisol, the processability may be improved, but there may be a problem that the migration phenomenon is deteriorated according to the increase in the plasticizer. In this way, it is preferable to use the succinate compound during the period of step 2) in order not only to improve the fogging properties but also to achieve low-viscosity properties for improving the processability.

In addition, continuously adding the first emulsifier during the polymerization period makes it easier to adjust the particle size of the polymer particles than in the case of a batch-type addition, so that latex stability and viscosity stability during mixing of the plastisol can be further improved. This feature may be achieved because the concentration of the emulsifier is rapidly increased in a short time in the initial stage of polymerization to thereby prevent the formation of particles having excessively small sizes and abnormal polymer particles, and the concentration of the emulsifier in the polymerization reactants may be maintained at a predetermined level.

Step 3

Step 3) according to an embodiment of the present invention may be a step in which the second emulsifier is continuously added after the adding of the first emulsifier adding in step 2) is completed. At this time, the first emulsifier and the second emulsifier are different from each other.

The type of the second emulsifier according to an embodiment of the present invention is not limited as long as differing from the first emulsifier. For example, the second emulsifier may have a higher critical micelle concentration (CMC) than the first emulsifier described above.

When an emulsifier having a higher CMC than the first emulsifier is used as the second emulsifier, it is possible to prevent the continuous generation of particles other than the initial stage of polymerization which may happen in the case of continuously using the emulsifier having a lower CMC during the polymerization reaction.

In addition, using a high-CMC emulsifier is more preferable because it is possible to produce a vinyl chloride-based polymer that exhibits low-viscosity properties by preventing the formation of additional particles.

Specifically, the second emulsifier may include a sulfate compound, and may include, for example, alkyl sulfate, alkyl ether sulfate, sulfated alkanolamide, monoglyceride sulfate, glycerol ether sulfate, fatty acid ether sulfate, and fatty acid amide ether sulfate. More specifically, the second emulsifier may include one or more selected from the group consisting of lauryl sulfate, dodecylbenzene sulfate, cetyl stearyl sulfate, and lauryl ether sulfate (laureth sulfate).

In this case, the sulfate compound may be used in the form of a salt ionically bonded with an alkali metal, alkaline earth metal, ammonium ion, amine and/or amino alcohol, and, for example, the sulfate compounds may be used in the form of a salt ionically bonded with sodium ions (Na+). For example, the sulfate compound may be used in the form of sodium lauryl sulfate, sodium dodecyl benzene sulfate, sodium cetyl stearyl sulfate, sodium lauryl ether sulfate (sodium laureth sulfate) or ammonium lauryl sulfate. Among them, the sulfate compound may preferably include sodium lauryl sulfate in terms of supplementing compatibility with a plasticizer to prevent sudden drop in viscosity even when the plasticizer is added, providing more stable viscosity properties, and densely forming foam cells during foaming, and further improving foaming properties. Here, supplementing the compatibility with a plasticizer indicates that a decrease in viscosity according to the adding of the plasticizer because of using the first emulsifier having an excellent plasticizer compatibility is appropriately controlled to thereby prevent the viscosity from being suddenly decreased to an extent that processing is impossible.

As described above, by further adding the second emulsifier which is different in compound type from the first emulsifier after the first emulsifier has been added, the compatibility with the plasticizer may be supplemented to prevent the viscosity from being suddenly decreased even when the plasticizer is added. Therefore, stable processing viscosity may be ensured. In addition, the density of the foam cells and the foaming properties may be further improved, which is difficult to be achieved by using only the first emulsifier.

In addition, the second emulsifier is specifically, started to be added from the time after the adding of the first emulsifier is completed, and continuously added until the time when the polymerization conversion rate reaches 70% to 95%, preferably 75% to 92%, more preferably 84% to 92%. In addition, the time after the adding of the first emulsifier is completed may specifically indicate a time immediately after the adding of the first emulsifier is completed, in this case, the second emulsifier may be added immediately after the adding of the first emulsifier is completed, and the addition termination time may specifically be a time at which the reaction is terminated.

In addition, the first emulsifier and the second emulsifier may be respectively added at a weight ratio of 5:5 to 9:1, specifically at a weight ratio of 6:4 to 9:1, and more specifically at a weight ratio of 6:4 to 8:2. When the above weight ratio is satisfied, the low-viscosity properties may be easily achieved and the fogging properties may be further improved; and when the weight ratio of the second emulsifier is too low, the stability of the initially generated particles may be deteriorated.

In addition, with respect to 100 parts by weight of vinyl chloride-based monomers, the total added amount of the first emulsifier and the second emulsifier may be 0.1 to 5.0 parts by weight, specifically 0.1 to 3.0 parts by weight, and more specifically 0.5 to 1.5 parts by weight.

In addition, when the first emulsifier and the second emulsifier are mixed and continuously added, there may be problems in that the second emulsifier, which has poor structural stability, is added from the initial stage of polymerization to cause the proportion of the hydrolyzate by the second emulsifier to be increased, so that the fogging properties of the polymer may be deteriorated. Furthermore, when the first emulsifier and the second emulsifier are mixed and continuously added, there may be problems in that the low-viscosity properties are not achieved and thus processability-enhancing effects are not ensured. Therefore, when the first emulsifier and the second emulsifier are sequentially added, it is possible to achieve the desired effect of the present disclosure, the improved processability and improved fogging properties through realization of low-viscosity properties.

In addition, the method for producing a vinyl chloride-based polymer according to an embodiment of the present invention uses two types of emulsifiers in a single reactor. Accordingly, even if a polymer is produced through a single polymerization reaction, a vinyl chloride-based polymer may be prepared, which exhibits viscosity properties to greatly improve the processability, has stable viscosity properties so that the viscosity does not sharply decrease depending on the added amount of a plasticizer, and has excellent fogging properties and foaming properties. In addition, unlike the case of blending polymers respectively having different viscosity properties and foaming properties, the above-described method is advantageous in that since there is no additional need for reservoirs (silo) for storing the respective polymers, weighing for uniform blending, and a mixing reservoir, manufacturing equipment is relatively simplified, and a separate blending process is not included to improving process efficiency. In addition, in the case of individually preparing and blending polymers, since the content of the total emulsifier in the blended polymers should be controlled in order to ensure excellent latex stability and fogging properties, and thus the content of the emulsifier that may be used during production of each polymer is relatively small, there may be a problem in that it is difficult to ensure polymerization stability in each polymerization. However, the production method according to the present disclosure may adopt a single polymerization reaction, and is thus advantageous in that the emulsifier may be used in an amount enough to maintain stability during the polymerization reaction, thereby having an excellent polymerization stability.

The polymerization carried out according to an embodiment of the present invention may be terminated when the internal pressure of the reactor reaches 3.0 to 5.0 kgf/cm$^2$ or the conversion rate reaches 90±5%.

In addition, according to the present disclosure, the step of drying the prepared vinyl chloride-based polymer may be further included, and in this case, drying is not particularly limited and may be performed through methods commonly known in the art, and specifically performed through a spray-drying method. Prior to the drying, a dehydration and a washing step may be further included.

BEST MODE

Hereinafter, preferred examples are presented to understand the present disclosure. However, the following examples are only illustrative of the present disclosure and are not intended to limit the scope of the present disclosure.

EXAMPLES

Example 1

After adding 175 kg of polymerization water, 125 g of potassium persulfate (KPS) and 140 g of sodium carbonate ($Na_2CO_3$) to a 500 L high-pressure reactor, the reactor was subjected to vacuuming while stirring the resultant mixture. After 175 kg of a vinyl chloride monomer was added to the reactor in a vacuum state, the temperature of the reactor was raised to 52° C. and polymerization was carried out. When the polymerization reaction was initiated, 1.40 kg of sodium dioctyl sulfosuccinate (DOSS) was continuously added to the reactor for 4 hours. At this time, the time when the adding of sodium dioctyl sulfosuccinate was completed was the time when a polymerization conversion rate reached 45%. Immediately after the adding of sodium dioctyl sulfosuccinate was completed, 0.35 kg of sodium lauryl sulfate (SLS) was continuously added to the reactor for 4 hours. At this time, the time when the adding of sodium lauryl sulfate was completed was the time when a polymerization conversion rate reached 90%. Upon completion of the adding of sodium lauryl sulfate, the reaction was terminated, and an unreacted vinyl chloride monomer was recovered and removed to obtain a vinyl chloride polymer latex. The obtained vinyl chloride polymer latex was sprayed and dried to prepare a powdery vinyl chloride polymer.

Example 2

A vinyl chloride polymer was prepared in the same manner as in Example 1, except that 1.05 kg of sodium dioctyl sulfosuccinate and 0.7 kg of sodium lauryl sulfate were added.

Example 3

A vinyl chloride polymer was prepared in the same manner as in Example 1, except that the time when the adding of sodium dioctyl sulfosuccinate was completed was the time when the polymerization conversion rate became 52%.

Example 4

A vinyl chloride polymer was prepared in the same manner as in Example 1, except that 0.875 kg of sodium dioctyl sulfosuccinate and 0.875 kg of sodium lauryl sulfate were added.

Example 5

A vinyl chloride polymer was prepared in the same manner as in Example 1, except that 0.7 kg of sodium dioctyl sulfosuccinate and 1.05 kg of sodium lauryl sulfate were added.

Comparative Example 1

A vinyl chloride polymer was prepared in the same manner as in Example 1 except that sodium dioctyl sulfosuccinate was not added, but 1.75 kg of sodium lauryl sulfate was continuously added to the reactor for 8 hours from the start of polymerization (until the conversion rate reached 90%).

Comparative Example 2

A vinyl chloride polymer was prepared in the same manner as in Example 1 except that sodium lauryl sulfate was not added, but 1.75 kg of sodium dioctyl sulfosuccinate was continuously added to the reactor for 8 hours from the start of polymerization (until the conversion rate reached 90%).

Comparative Example 3

A vinyl chloride polymer was prepared in the same manner as in Example 1, except that sodium lauryl sulfate was used instead of sodium dioctyl sulfosuccinate, and sodium dioctyl sulfosuccinate was used instead of sodium lauryl sulfate.

Comparative Example 4

A vinyl chloride polymer was prepared in the same manner as in Example 2, except that sodium lauryl sulfate was used instead of sodium dioctyl sulfosuccinate, and sodium dioctyl sulfosuccinate was used instead of sodium lauryl sulfate.

Comparative Example 5

A vinyl chloride polymer was prepared in the same manner as in Example 2, except that sodium dioctyl sulfosuccinate and sodium lauryl sulfate were not added sequentially, but sodium dioctyl sulfosuccinate and sodium lauryl sulfate were mixed and continuously added to the reactor for 8 hours from the start of a polymerization (until the conversion rate reached 90%).

Comparative Example 6

A vinyl chloride polymer was prepared in the same manner as in Example 1, except that sodium dioctyl sulfosuccinate was added until the conversion rate reached 25%, and sodium lauryl sulfate was added immediately thereafter.

Comparative Example 7

A vinyl chloride polymer was prepared in the same manner as in Example 1, except that sodium dioctyl sulfosuccinate was added until the conversion rate reaches 60%, and sodium lauryl sulfate was added immediately thereafter.

Experimental Example 1: Measurement of Fogging Properties of Vinyl Chloride Polymer In order to analyze the fogging properties of the vinyl chloride polymers prepared in Examples and Comparative Examples, the generation degree of volatile organic compounds was measured. The generation degree of volatile organic compounds was measured using a fogging tester according to DIN 75-201 B (Horizon-FTS, manufactured by Thermo Fisher Scientific Inc.), and the result thereof are shown in Table 1 below.

Specifically, 10 g of each of the vinyl chloride polymers was put into a cylinder, and the top of the cylinder was covered with an aluminum foil, and then heated at 100° C. for 16 hours. Thereafter, the volatile organic compounds collected on the surface of the aluminum foil were measured through Equation 1 below. As the measured value is lower, the generation amount of the volatile organic compounds becomes smaller the fogging properties become more excellent.

Fogging properties (mg)=mass of aluminum foil after fogging test−mass of aluminum foil before fogging test  [Equation 1]

Experimental Example 2: Measurement of Physical Properties of Plastisol

The viscosity properties of a plastisol containing each vinyl chloride polymer prepared in the above Example and Comparative Example and foam cells of a foam were measured, and the results thereof are shown in Table 1 below.

1) Characteristics of Cross-Section of Foam (Foam Cell)

Each plastisol was prepared by stirring, at 800 rpm for 10 minutes, 100 g of each vinyl chloride polymer prepared in Example 1 and Comparative Example 2, 100 g of diisononyl phthalate (DINP), 3 g of Ba—Zn stabilizer, and 3 g of AZO-based foaming agent by using a Werke mixer (EUROSTAR IKA). Each prepared plastisol was applied to a release paper, coating is performed with a 0.5 mm rod, and then dried at 150° C. for 45 seconds using a Mathis oven to prepare a pre-gelled sheet, which was then heated to 210° C. for 100 seconds. Thereafter, the final gelled sheet (foam) was cut and the cross section of the foam was observed using an optical microscope (NIKON SMZ1500).

Figure 2:
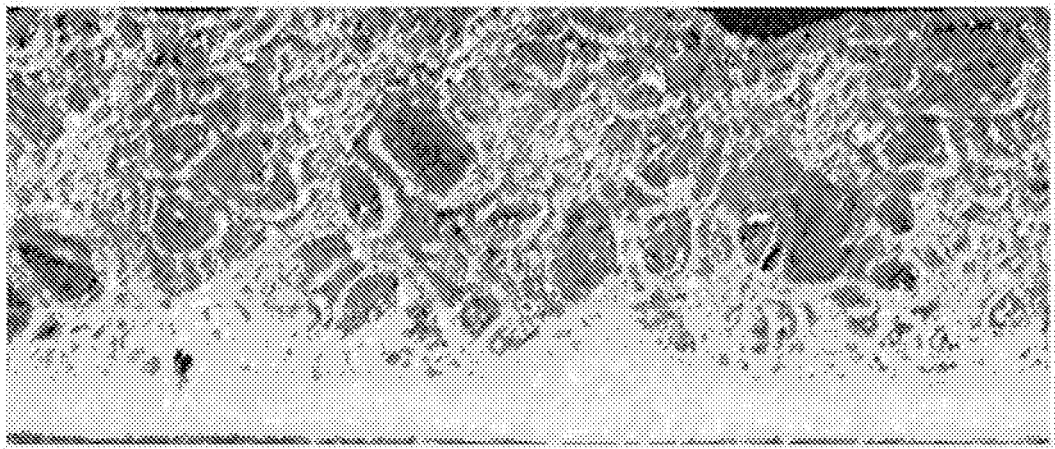
FIG. 2 is an image that shows a cross section of a foam prepared from a polymer of Comparative Example 2 of the present disclosure and is taken with an optical microscope.

FIG. 1 is a photograph showing the cross-section of the foam of Example 1, FIG. 2 is a photograph showing the cross-section of the foam of Comparative Example 2. As shown in FIG. 1 and FIG. 2, it can be observed that in Example 1 in which an emulsifier other than a succinate compound, and specifically a sodium lauryl sulfate emulsifier is used as a second emulsifier, foam cells were formed more densely than in Comparative Example 2 in which the succinate compound, which is a first emulsifier, is continuously used without changing a second emulsifier.

2) General Viscosity Measurement

Each plastisol was prepared by stirring, at 800 rpm for 10 minutes, 100 g of each vinyl chloride polymer prepared in Example and Comparative Example and 100 g of diisononyl phthalate (DINP) by using a Werke mixer (EUROSTAR IKA), and 1 hour after mixing the plastisol, the viscosity of the plastisol was measured at room temperature (23±3° C.). At this time, the viscosity was measured using a Brookfield viscometer (Brookfield, DV-1 viscometer) under the condition of #64 spindle and 12 rpm, and the results thereof are shown in Table 1 below.

3) Process Viscosity Measurement

Each plastisol was prepared by stirring at 800 rpm for 10 minutes 100 g of each vinyl chloride polymer prepared in Example and Comparative Example and 100 g of diisononyl phthalate (DINP) by using a Werke mixer (EUROSTAR IKA), and 1 hour after mixing the plastisol, the viscosity was measured in the same manner as in the viscosity measuring method in 2) above, and the results thereof are shown in Table 1 below.

TABLE 1

| Classification | First emulsifier | | | Second emulsifier | | | Viscosity property (Pa · s) | | Fogging property (mg) |
| | Type | Adding period (conversion rate, %) | Added amount (phm) | Type | Adding period (conversion rate, %) | Added amount (phm) | General viscosity | Processing viscosity | |
| --- | --- | --- | --- | --- | --- | --- | --- | --- | --- |
| Example 1 | DOSS | 0-45 | 0.8 | SLS | 45-90 | 0.2 | 65 | 13 | 0.22 |
| Example 2 | DOSS | 0-45 | 0.6 | SLS | 45-90 | 0.4 | 79 | 12 | 0.35 |
| Example 3 | DOSS | 0-52 | 0.8 | SLS | 52-90 | 0.2 | 61 | 11 | 0.24 |
| Example 4 | DOSS | 0-45 | 0.5 | SLS | 45-90 | 0.5 | 94 | 21 | 0.41 |
| Example 5 | DOSS | 0-45 | 0.4 | SLS | 45-90 | 0.6 | 113 | 28 | 0.48 |
| Comparative Example 1 | SLS | 0-90 | 1.0 | — | — | — | 230 | 50 | 3.42 |
| Comparative Example 2 | DOSS | 0-90 | 1.0 | — | — | — | 35 | 4 | 0.12 |
| Comparative Example 3 | SLS | 0-45 | 0.8 | DOSS | 45-90 | 0.2 | 167 | 36 | 0.67 |
| Comparative Example 4 | SLS | 0-45 | 0.6 | DOSS | 45-90 | 0.4 | 173 | 34 | 0.51 |
| Comparative Example 5 | DOSS + SLS | 0-90 | DOSS: 0.6 SLS: 0.4 | — | — | — | 170 | 29 | 0.49 |
| Comparative Example 6 | DOSS | 0-25 | 0.8 | SLS | 25-90 | 0.2 | Unable to dry due to poor latex stability | | |
| Comparative Example 7 | DOSS | 0-60 | 0.8 | SLS | 60-90 | 0.2 | 57 | 6 | 0.23 |

As shown in Table 1, it can be seen that Examples 1 to 5, in which the first emulsifier uses a succinate compound, the second emulsifier uses an emulsifier different from the first emulsifier, and an adding period of the first emulsifier satisfies the range of the present disclosure, provide low viscosity stably and exhibit excellent fogging properties compared to Comparative Examples 1 to 7 in which at least one of these conditions is not satisfied.

Specifically, it can be confirmed that Examples 1 to 5 achieve low-viscosity properties compared to Comparative Example 1 in which only a single type of an emulsifier, especially only sodium lauryl sulfate is used throughout the polymerization reaction, and in particular, Examples 1 to 5 exhibit significantly improved fogging properties. Compared to Comparative Example 2 in which only sodium dioctyl sulfosuccinate is used as a single type of an emulsifier, it can be confirmed that in Examples 1 to 5, the rapid viscosity decrease due to the adding of a plasticizer does not occur, thereby achieving stable viscosity properties. In the case of Comparative Example 2, the adding of the plasticizer results in a significant decrease in viscosity to cause a sol drop phenomenon during processing, so that the vinyl chloride polymer has too low viscosity to be processed.

In addition, it can be confirmed that Examples 1 to 5 exhibit improved fogging properties while achieving low-viscosity properties, compared to Comparative Examples 3 and 4 in which the adding order of the emulsifiers was changed. It can also be predicted that in Examples 1 to 5, a processability is improved by achieving low-viscosity properties compared to Comparative Example 5 in which the first emulsifier and the second emulsifier were mixed and added simultaneously from the beginning. In particular, it can be seen that the fogging properties in Examples 1 to 5 are greatly improved compared to those in Comparative Example 5.

In addition, it can be confirmed that in Examples 1 to 5, it is possible to obtain a normal latex that has stable viscosity properties compared to Comparative Examples 6 and 7 in which the adding period of the first emulsifier falls outside the range of the present disclosure. Among these, it can be confirmed that in Comparative Example 6, a polymerization stability is not secured due to a too short adding period of the first emulsifier, and it is difficult to obtain a normal latex.

In the present disclosure, it was confirmed that the fogging properties of the vinyl chloride-based polymer and the viscosity properties of the plastisol are affected according to the type of an emulsifier, an adding period, and an adding method. In addition, it can be confirmed that a succinate compound is used as the first emulsifier, is added during a specific period, and then the second emulsifier different from the first emulsifier is then used, so that the prepared polymer may achieve excellent fogging properties and stable low-viscosity properties.

The above description of the present disclosure is for illustration purposes, those of ordinary skills in the art to which the embodiment of inventive concept pertains will be able to understand that the invention may be implemented in other specific forms without changing the technical idea or essential features. Therefore, the Examples are illustrative in all respects and examples should be understood as not limiting.

The invention claimed is:

1. A method for producing a vinyl chloride-based polymer, the method comprising the steps of:
   1) Adding a vinyl chloride-based monomer into a reactor to initiate polymerization;
   2) Continuously adding a first emulsifier to the reactor from a polymerization initiation time to a time when a polymerization conversion rate reaches a range of 35% to 52%; and
   3) Continuously adding a second emulsifier after completing the adding of the first emulsifier,
   wherein the first emulsifier and the second emulsifier are different from each other, the first emulsifier is a succinate compound, and the second emulsifier comprises a sulfate compound,
   the first emulsifier and the second emulsifier are added at a weight ratio of 6:4 to 9:1, and
   wherein the second emulsifier comprises at least one selected from the group consisting of alkyl ether sulfate, sulfate alkanolamide, monoglyceride sulfate, glycerol ether sulfate, fatty acid ether sulfate, and fatty acid amide ether sulfate.

2. The method for producing a vinyl chloride-based polymer of claim 1, wherein the second emulsifier is continuously added until the polymerization conversion rate reaches a range of 70% to 95%.

3. The method for producing a vinyl chloride-based polymer of claim 1, wherein the second emulsifier is added immediately after the adding of the first emulsifier is completed.

4. The method for producing a vinyl chloride-based polymer of claim 1, wherein the second emulsifier has a higher critical micelle concentration (CMC) than the first emulsifier.

5. The method for producing a vinyl chloride-based polymer of claim 1, wherein the total added amount of the first emulsifier and the second emulsifier is 0.1 to 5.0 parts by weight with respect to 100 parts by weight of the vinyl chloride-based monomer.

6. The method for producing a vinyl chloride-based polymer of claim 1, wherein the first emulsifier comprises at least one succinate compound selected from the group consisting of sodium dioctyl sulfosuccinate, sodium ditridecyl sulfosuccinate, disodium laureth sulfosuccinate, and sodium lauryl sulfosuccinate.

7. The method for producing a vinyl chloride-based polymer of claim 1, wherein in step 1), a carbonate-based metal salt is further added.

8. The method for producing a vinyl chloride-based polymer of claim 1, wherein in step 1), an initiator and polymerization water are further added.

9. The method for producing a vinyl chloride-based polymer of claim 1, wherein the polymerization is carried out by an emulsion-polymerization method.

* * * * *